(12) United States Patent
Gwock

(10) Patent No.: US 10,554,930 B2
(45) Date of Patent: *Feb. 4, 2020

(54) METHOD AND SYSTEM FOR PROVIDING VIDEO STREAM OF VIDEO CONFERENCE

(71) Applicant: LINE Corporation, Shinjuku-Ku, Tokyo (JP)

(72) Inventor: Jung nam Gwock, Seongnam-si (KR)

(73) Assignee: LINE Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/356,298

(22) Filed: Mar. 18, 2019

(65) Prior Publication Data

US 2019/0215485 A1    Jul. 11, 2019

Related U.S. Application Data

(63) Continuation of application No. 15/673,854, filed on Aug. 10, 2017, now Pat. No. 10,264,216.

(30) Foreign Application Priority Data

Aug. 16, 2016 (KR) ........................ 10-2016-0103738

(51) Int. Cl.
*H04N 7/15* (2006.01)
*H04N 5/343* (2011.01)
(Continued)

(52) U.S. Cl.
CPC ........... *H04N 7/152* (2013.01); *H04L 65/403* (2013.01); *H04L 65/605* (2013.01);
(Continued)

(58) Field of Classification Search
CPC combination set(s) only.
See application file for complete search history.

(56) References Cited

U.S. PATENT DOCUMENTS

| 8,773,494 B2 | 7/2014 | Barkley et al. |
| 2009/0310016 A1 | 12/2009 | Fukuda et al. |

(Continued)

FOREIGN PATENT DOCUMENTS

| KR | 10-2010-0052992 A | 5/2010 |
| KR | 10-2011-0000052 A | 1/2011 |

(Continued)

*Primary Examiner* — Phung-Hoang J Nguyen
(74) *Attorney, Agent, or Firm* — Harness, Dickey & Pierce, P.L.C.

(57) ABSTRACT

Provided is a method and system for providing a video stream for a video conference. A video stream providing method may include managing class information in which a resolution range for the video conference is classified into a plurality of classes; determining at least two classes in which a resolution providable from a source providing client that participates in the video conference is included among the plurality of classes, based on the class information; encoding a video stream for the video conference as a plurality of layers using a resolution set for each of the determined at least two classes; and controlling an electronic device of the source providing client to transmit the video stream encoded as the plurality of layers to a server for the video conference over a network.

16 Claims, 10 Drawing Sheets

(51) Int. Cl.
    *H04L 29/06*     (2006.01)
    *H04N 7/14*     (2006.01)
    *H04N 5/232*     (2006.01)

(52) U.S. Cl.
    CPC ........... *H04L 65/607* (2013.01); *H04N 5/343* (2013.01); *H04N 5/23245* (2013.01); *H04N 7/147* (2013.01); *H04N 7/148* (2013.01)

(56) References Cited

U.S. PATENT DOCUMENTS

| | | |
|---|---|---|
| 2013/0260893 A1 | 10/2013 | Shin et al. |
| 2013/0332543 A1 | 12/2013 | Shin et al. |
| 2014/0009678 A1 | 1/2014 | Kimoto |
| 2014/0019540 A1 | 1/2014 | Shin et al. |
| 2014/0023138 A1 | 1/2014 | Chen |
| 2014/0068013 A1* | 3/2014 | Chen .................. H04L 65/604 709/219 |
| 2015/0103896 A1 | 4/2015 | Kim et al. |
| 2016/0066007 A1 | 3/2016 | Zhang |
| 2016/0119399 A1* | 4/2016 | Glass .................. H04N 19/44 709/219 |
| 2016/0127732 A1 | 5/2016 | Mittal |
| 2016/0134677 A1* | 5/2016 | Mueller .............. H04L 65/602 709/219 |
| 2017/0134461 A1 | 5/2017 | Li |
| 2017/0324934 A1 | 11/2017 | Barkley et al. |

FOREIGN PATENT DOCUMENTS

| | | |
|---|---|---|
| KR | 10-2011-0103948 A | 9/2011 |
| KR | 10-1100413 B1 | 12/2011 |
| KR | 10-2012-0134319 A | 12/2012 |
| KR | 10-2013-0065751 A | 6/2013 |
| KR | 10-2013-0104572 A | 9/2013 |
| WO | WO-2015/065001 A1 | 5/2015 |

\* cited by examiner

METHOD AND SYSTEM FOR PROVIDING VIDEO STREAM OF VIDEO CONFERENCE

CROSS-REFERENCE TO RELATED APPLICATION(S)

This application is a continuation of U.S. non-provisional application Ser. No. 15/673,854, filed on Aug. 10, 2017, which claims the benefit of priority under 35 U.S.C. § 119 to Korean Patent Application No. 10-2016-0103738 filed on Aug. 16, 2016, in the Korean Intellectual Property Office (KIPO), the entire contents of each of which are incorporated herein by reference.

BACKGROUND

Field

One or more example embodiments relate to a video stream providing method, apparatus and system for a video conference, and a non-transitory computer-readable storage medium storing a computer program to perform a video stream providing method for a video conference in conjunction with an electronic device configured as a computer.

Description of Related Art

A video conference refers to a type of a remote meeting that proceeds as if people present at remote locations are present in a single place through a communication network using image data (e.g., video) and voice data. In the video conference, although the data is compressed, the amount of data to be transmitted and received may increase according to an increase in the resolution of an image, for example, the size of an image screen. Also, it may be difficult to transfer a video stream to a specific user, for example, a user of a terminal incapable of playing the video stream at a corresponding resolution, among the people present in the video conference.

To overcome the above issues, a video conference system according to the related art provides a video stream having two or more types of resolutions. For example, a video conference system according to the related art transmits a video stream only at a resolution available to all of the participants of the video conference, or decodes a received video stream and transcodes the decoded video stream to a low resolution video stream and transfers the transcoded video stream.

However, transcoding causes great processing load on a server side. Also, when providing a video stream having two or more types of resolutions, a screen size is not separately classified. Accordingly, if the screen size is not a desired size, it may cause a bad effect against the performance of the video streaming when the participant resizes the screen size of the video stream.

SUMMARY

One or more example embodiments relate to a video stream providing method, apparatus, and system for a video conference that may reduce a processing load on a server of the video conferencing system in such a manner that a source providing client encodes a video stream as a plurality of layers for a plurality of screen sizes, including for example, various screen resolutions and provides the encoded video stream to a server. Additionally, one or more example embodiments relate to a non-transitory computer-readable storage medium storing a computer program to perform the video stream providing method for the video conference in conjunction with an electronic device configured as a computer.

One or more example embodiments also provide a video stream providing method, apparatus, and system for a video conference that may use a screen without resizing the screen by classifying a resolution ranges into a plurality of classes, by providing a layer having a resolution included in a resolution range of each class, and by using a resolution of a camera of a client and another resolution set based on the input resolution, and a non-transitory computer-readable storage medium storing a computer program to perform the video stream providing method for the video conference in conjunction with an electronic device configured as a computer.

According to an aspect of at least one example embodiment, there is provided a non-transitory computer-readable storage medium storing computer readable instructions that, when executed by at least one processor, cause the at least one processor to perform a video stream providing method for a video conference, the method including managing class information including a video resolution range for the video conference classified into a plurality of classes; determining at least two classes from the plurality of classes based on video resolutions available from a source providing client that participates in the video conference based on the class information; encoding a video stream for the video conference, the video stream including a plurality of layers, using a video resolution set for each of the determined at least two classes; and controlling an electronic device of the source providing client to transmit the video stream encoded as the plurality of layers to a server for the video conference over a network.

According to an aspect of at least one example embodiment, there is provided a video stream providing method for a video conference, the method including managing, using at least one processor, class information including a video resolution range for the video conference classified into a plurality of classes; determining, using the at least one processor, at least two classes from the plurality of classes based on video resolutions available from a source providing client that participates in the video conference based on the class information; encoding, using the at least one processor, a video stream for the video conference, the video stream including a plurality of layers, using a video resolution set for each of the determined at least two classes; and controlling, using the at least one processor, an electronic device of the source providing client to transmit the video stream encoded as the plurality of layers to a server for the video conference over a network.

According to an aspect of at least one example embodiment, there is provided a video stream providing method of a server for a video conference, the method including receiving, using at least one processor, a video stream encoded as a plurality of layers based on a plurality of video resolutions available from a source providing client that participates in the video conference; receiving, using the at least one processor, information associated with a video resolution playable at each of at least two receiving clients that participate in the video conference; determining, using the at least one processor, a layer of the video stream to be transmitted to a first receiving client among the at least two receiving clients based on the received information associated with the video resolution received from the first receiving client; and transmitting, using the at least one processor, the determined layer of the video stream to the first receiving client.

According to some example embodiments, since a source providing client encodes a video stream as a plurality of layers for each screen size, including for example, various resolutions and provides the encoded video stream to a server when providing a video stream for the video conference, it is possible to reduce a load on a server side.

Also, according to some example embodiments, it is possible to use a screen as is without resizing the screen by classifying a resolution ranges into a plurality of classes, by providing a layer having a resolution included in a resolution range of each class, and by using a resolution input through a camera of a client and another resolution set based on the input resolution.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
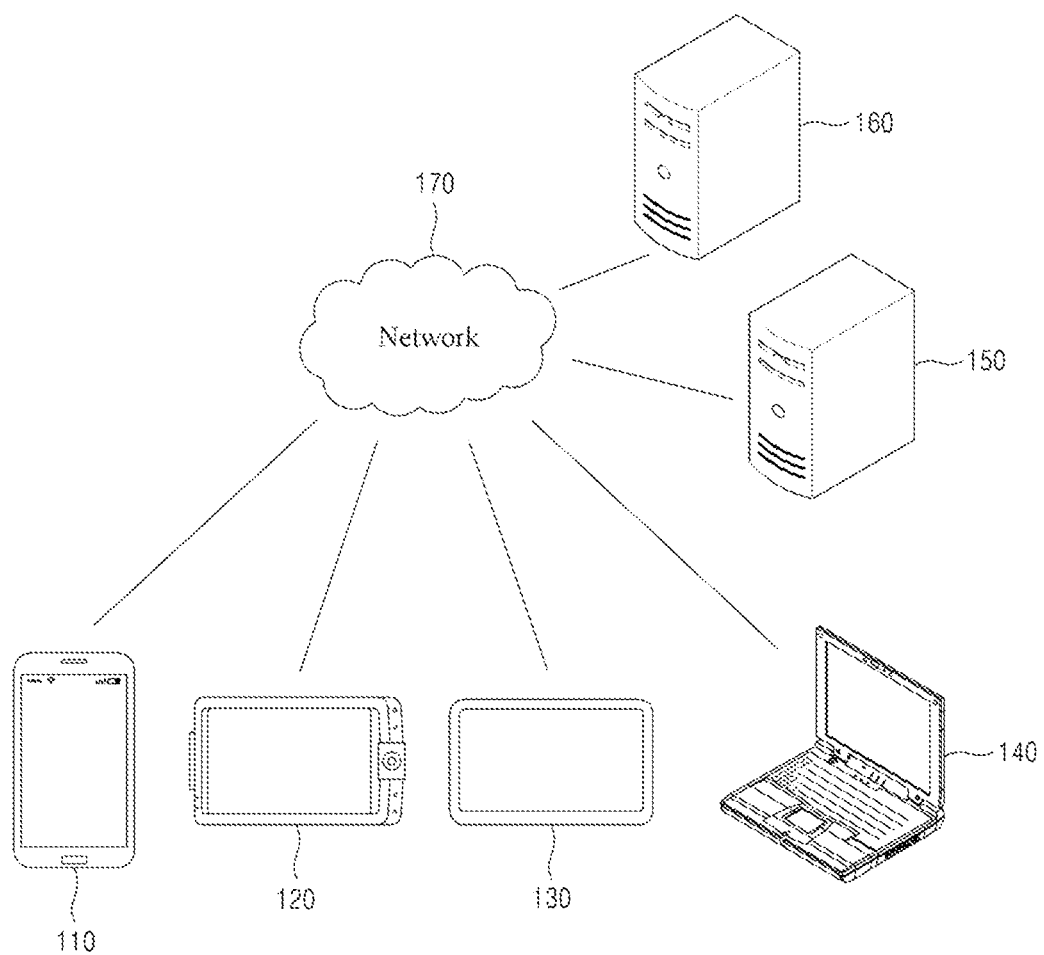
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings.

Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU, a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

A video stream providing system including at least one server for a video conference (e.g., a video conferencing server) according to some example embodiments may be configured through an electronic device and/or a server to be described in the following, and a video stream providing method of a server for a video conference system according to some example embodiments may be performed by the electronic device and/or the server. For example, electronic devices may participate in a video conference through at least one server and a video stream transmitted from a single electronic device may be transferred to other electronic devices that participate in the video conference through the at least one server. Here, a computer program for receiving a service for the video conference may be installed on the electronic devices and the electronic devices may perform the video stream providing method of the server for the video conference according to at least one example embodiment under control of the installed computer program. The server may provide a service for the video conference to the electronic devices under control of the computer program installed on the server. The computer program may be stored in a non-transitory computer-readable storage medium to perform the video stream providing method in conjunction with the electronic device and/or the server configured as a computer.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, the number of electronic devices and/or the number of servers are not limited thereto and may be greater or lesser than the numbers illustrated in FIG. 1.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, a personal navigation device, a personal computer, a laptop computer, a digital broadcasting terminal, a personal digital assistant (PDA), a portable multimedia player (PMP), a tablet personal computer, a gaming console, a wearable device, an Internet of Things (IoT) device, a virtual reality device, an augmented reality device, and the like. Although FIG. 1 illustrates a smartphone as an example of the electronic device 110, it is provided as an example only. In at least one example embodiment, the electronic device 110 may indicate one of various devices that may communicate with other electronic devices 120, 130, and/or 140, and/or the servers 150 and/or 160 over the network 170 in a wired communication manner and/or in a wireless communication manner.

The communication scheme is not particularly limited and may include a communication method that uses a near field communication between devices as well as a communication method using a communication network, for example, a mobile communication network, the wired Internet, the wireless Internet, and a broadcasting network, a satellite network, etc., which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, these are only examples and the example embodiments are not limited thereto.

Each of the servers 150 and 160 may be configured as a computer apparatus or a plurality of computer apparatuses that provides instructions (e.g., computer readable instructions), codes, files, contents, services, and the like through communication with the plurality of electronic devices 110, 120, 130, and/or 140 over the network 170. For example, the server 150 may be a system that provides a first service to one or more electronic devices, such as the plurality of electronic devices 110, 120, 130, and 140, connected through the network 170, and the server 160 may be a system that provides a second service to one or more electronic devices, such as the plurality of electronic devices 110, 120, 130, and 140, connected through the network 170. In detail, the server 150 may be a system that provides a service for a video conference to the plurality of electronic devices 110, 120, 130, and 140 as the first service. Also, the server 160 may be a file distribution system that provides an installation file of an application, for example, the computer program including computer readable instructions, for receiving the service for the video conference to one or more electronic devices, such as the plurality of electronic devices 110, 120, 130, and 140, as the second service.

Figure 2:
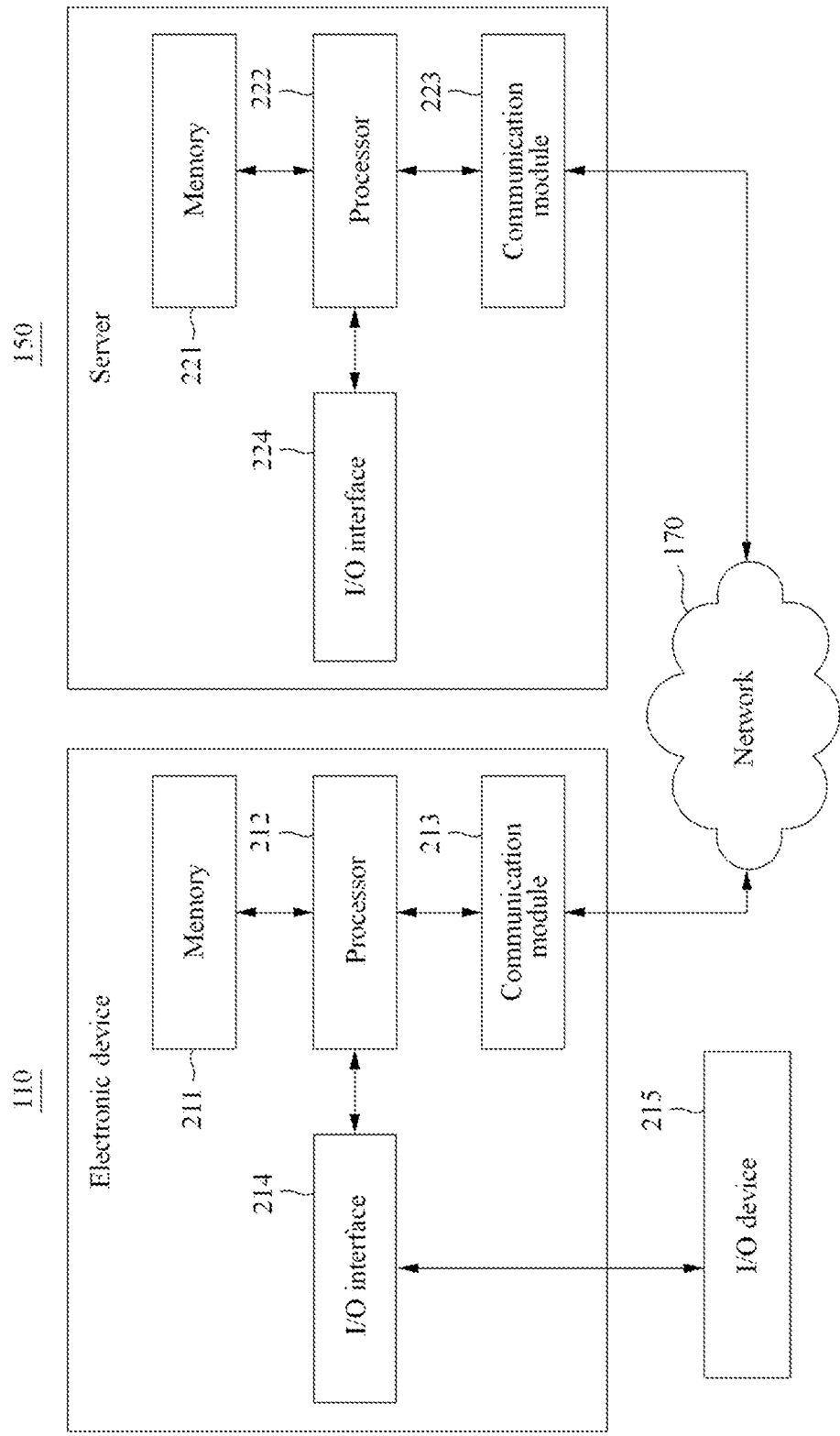
FIG. 2 is a block diagram illustrating an example of a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The same or similar components may be applicable to other electronic devices 120, 130, and/or 140, or the server 160, and also to still other electronic devices or still other servers.

Referring to FIG. 2, the electronic device 110 may include a memory 211, at least one processor 212, a communication module 213, and an input/output (I/O) interface 214, etc., and the server 150 may include a memory 221, at least one processor 222, a communication module 223, and an I/O interface 224, etc., but the example embodiments are not limited thereto and may include a greater or lesser number of constituent components. The memory 211, 221 may include a permanent mass storage device, such as random access memory (RAM), read only memory (ROM), a disk drive, a solid state drive, a flash memory, etc., as a non-transitory computer-readable storage medium. Here, a permanent mass storage device such as ROM, a solid state drive, a flash memory, and/or a disk drive, etc., may be included in the electronic device 110 and/or the server 150 as a separate permanent storage device separate from the memory 211, 221. Also, an OS and at least one program code (e.g., computer readable instructions), for example, a code for an application installed on the electronic device 110 to provide a specific service, a browser installed and executed on the electronic device 110, etc., may be stored in the memory 211, 221. Such software components may be loaded from another non-transitory computer-readable storage medium separate from the memory 211, 221 using a drive mechanism. The other non-transitory computer-readable storage medium may include, for example, a floppy drive, a disk, a tape, a Blu-ray/DVD/CD-ROM drive, a memory card, etc. According to other example embodiments, software components may be loaded to the memory 211, 221 through the communication module 213, 223, instead of, or in addition to, the non-transitory computer-readable storage medium. For example, at least one program may be loaded to the memory 211, 221 based on a program, for example, the application, installed by files provided over the network 170 from developers or a file distribution system, for example, the server 160, which provides an installation file of the application.

The processor 212, 222 may be configured to process computer-readable instructions, for example, the aforementioned at least one program code, of a computer program by performing basic arithmetic operations, logic operations, and I/O operations. The computer-readable instructions may be provided from the memory 211, 221 and/or the communication module 213, 223 to the processor 212, 222. For example, the processor 212, 222 may be configured to execute received computer readable instructions in response to the program code stored in the storage device, such as the memory 211, 222.

The communication module 213, 223 may provide a function for communication between the electronic device 110 and the server 150 over the network 170, and may provide a function for communication between the electronic device 110 and/or the server 150 and another electronic device, for example, the electronic device 120 or another server, for example, the server 160. For example, the processor 212 of the electronic device 110 may transfer a request created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the aforementioned permanent storage device, further includable in the electronic device 110.

The I/O interface 214 may be a device used for interface with an I/O device 215. For example, an input device may include a keyboard, a mouse, a microphone, a camera, etc., and an output device may include a device, such as a display, a speaker, a haptic feedback device, etc. As another example, the I/O interface 214 may be a device for interface with an apparatus in which an input function and an output function are integrated into a single function, such as a touch screen. The I/O device 215 may be configured as a single device with the electronic device 110. Also, the I/O interface 224 of the server 150 may be a device for interface with a device (not shown) for input or output that may be connected to the server 150 and/or included in the server 150. In detail, when processing instructions of the computer program loaded to the memory 211, the processor 212 of the electronic device 110 may display a service screen configured using data provided from the server 150 and/or the electronic device 120, or may display content on a display through the I/O interface 214.

According to other example embodiments, the electronic device 110 and the server 150 may include a greater or lesser number of components than a number of components shown in FIG. 2. For example, the electronic device 110 may include at least a portion of the I/O device 215, or may further include other components, for example, a transceiver, a global positioning system (GPS) module, a camera, a variety of sensors, a database, and the like. In detail, if the electronic device 110 is a smartphone, the electronic device 110 may be configured to further include a variety of components, for example, an accelerometer sensor, a gyro sensor, a camera, various physical buttons, a button using a touch panel, an I/O port, a motor for providing haptic feedback (e.g., vibration), etc., which are generally included in the smartphone.

Figure 3:
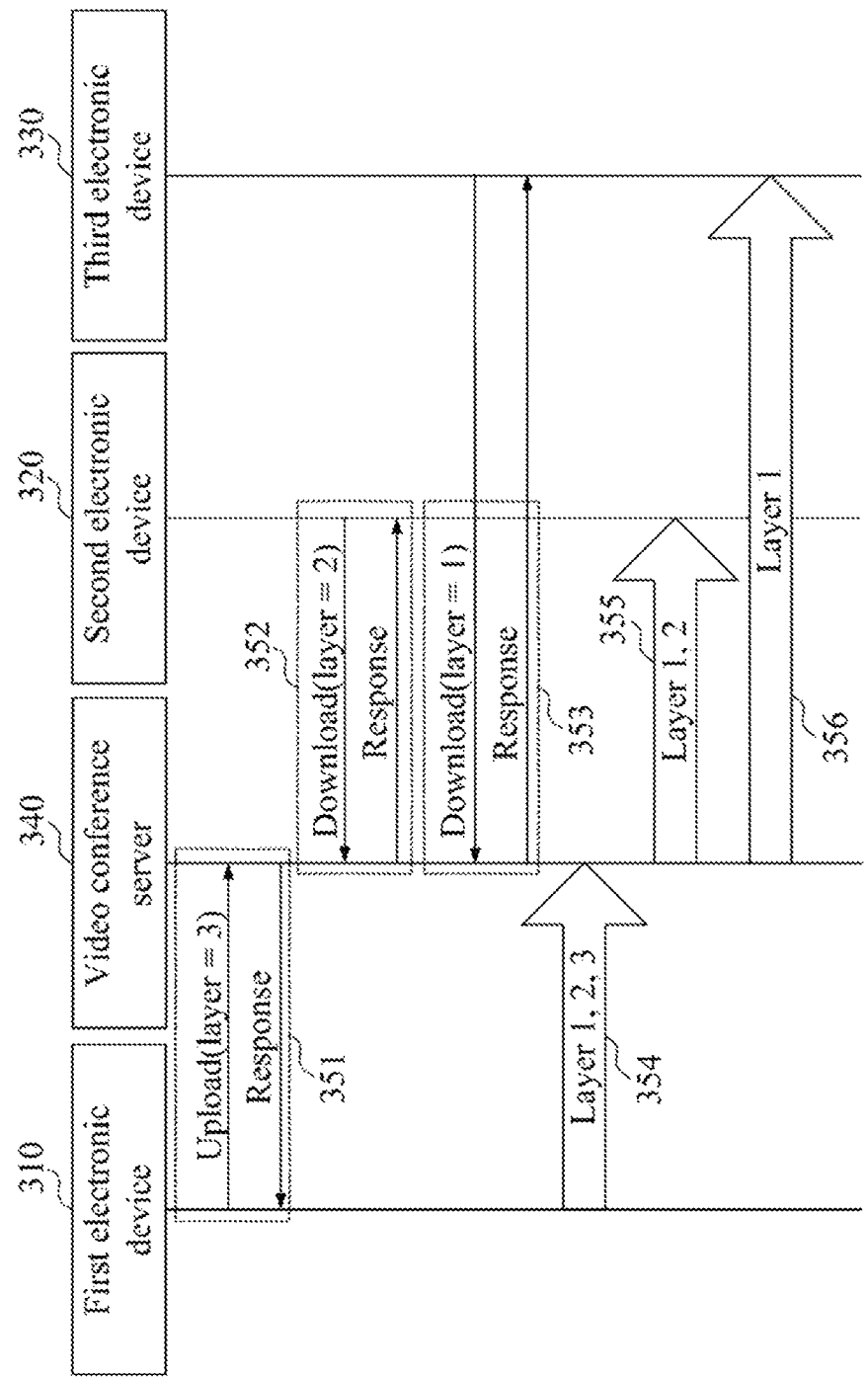
FIG. 3 is a diagram illustrating an example of an entire system for providing a video stream according to at least one example embodiment.

FIG. 3 is a diagram illustrating an example of an entire system for providing a video stream according to at least one example embodiment. FIG. 3 illustrates a first electronic device 310, a second electronic device 320, a third electronic device 330, and a video conference server 340, but the example embodiments are not limited thereto. Each of the first electronic device 310, the second electronic device 320, and the third electronic device 330 may be configured as the aforementioned electronic device 110, and the video conference server 340 may be configured as the aforementioned server 150.

Here, the first electronic device 310, the second electronic device 320, and the third electronic device 330 may be terminals that participate in a video conference through the network 170, and may transmit and/or receive a video stream for the video conference. Each of the first electronic device 310, the second electronic device 320, and the third electronic device 330 may be a sender and/or a receiver of the video stream, but the video conference is not limited thereto and there may be a greater or lesser number of electronic devices participating in the video conference and the video stream. For clarity of description, it is assumed that the first electronic device 310 is a source providing client that transmits the video stream and the second electronic device 320 and the third electronic device 330 are receiving clients that receive the video stream. Also, the video conference server 340 may be an apparatus that provides a service to enable the video conference among the first electronic device 310, the second electronic device 320, and the third electronic device 330.

A process represented by a first box 351 indicated with dotted lines shows an example of a process in which the first electronic device 310 participating in the video conference notifies the video conference server 340 of a providable and/or desired size of the first electronic device 310 and the video conference server 340 responds thereto. Here, a source providing client (e.g., the first electronic device 310) may indicate in the source video stream that the first electronic device 310 desires to upload a video stream to the video conference server 340 to monitor the progress of the video conference. The size of the source may indicate a resolution that may be provided from the first electronic device 310 (e.g., the video resolution of the video stream being transmitted by the first electronic device 310). For example, the first electronic device 310 may encode the video stream as n layers, each of the n layers having different resolutions, based on classification information in which a resolution range for the video conference is classified (e.g., divided, etc.) into a plurality of classes. Here, n denotes a natural number greater than or equal to 2.

Additionally, the size (e.g., the layers) of the source (e.g., the source video stream), providable (e.g., capable of being provided, possible, potential resolutions, etc.) from the first electronic device 310 may be determined by the first electronic device 310 based on a network situation and/or central processing unit (CPU) power of the first electronic device 310. The network situation may be network traffic, network congestion, available bandwidth, etc., measured by the first electronic device 310, the video conference server 340, etc.

The following Table 1 shows an example embodiment in which the resolution range for the video conference is classified into three classes, but the example embodiments are not limited thereto. Here, the resolution range may be classified based on width×height.

TABLE 1

| Resolution Range | Class | Layer Identifier |
|---|---|---|
| 0~496 × 360 | First class (QVGA class) | 1 |
| 496 × 360 + 1~640 × 480 | Second class (VGA class) | 2 |
| 640 × 480 + 1~1280 × 960 | Third class (HD(720p) class) | 3 |

Here, referring to the first box 351 indicated with dotted lines, "layer=3" may correspond to the layer identifier 3 of Table 1, and the first electronic device 310 may notify the video conference server 340 that the first electronic device 310 may provide a layer 1 source video stream corresponding to the first class, a layer 2 source video stream corresponding to the second class, and a layer 3 source video stream corresponding to the third class, etc.

A resolution of each layer may be included in a resolution range of a corresponding class. Here, the resolution of each layer may be set among values included in a resolution range of a classified class instead of being fixed to a specific value. For example, a screen size input through a camera included in each of the plurality of electronic devices may be inconsistent, or in other words, the screen resolution of images captured by the cameras of the plurality of electronic devices participating in the video conference may be different due to different camera capabilities, different camera settings, etc. If a value of the resolution of the second layer is fixed to 640×480 and an image having a different resolution, for example, 635×475, is input through the camera, the resolution of the image needs to be resized. However, according to some example embodiments, image resizing is not required for the video stream based on the setting the value of the resolutions for the layer to a resolution range for each layer class instead of fixing the resolution of the layer class to a single resolution value. Accordingly, performance may be enhanced.

Although three classes and three layers are described with reference to Table 1, the resolution range for the video conference may be classified into n classes and n layers may be present. For example, Table 2 shows an example embodiment in which the resolution range for the video conference is classified into four classes.

TABLE 2

| Resolution Range | Class | Layer Identifier |
|---|---|---|
| 0~248 × 192 | Zero-th class (thumbnail class) | 0 |
| 248 × 192 + 1~496 × 360 | First class (QVGA class) | 1 |
| 496 × 360 + 1~640 × 480 | Second class (VGA class) | 2 |
| 640 × 480 + 1~1280 × 960 | Third class (HD(720p) class) | 3 |

In at least one example embodiment, a resolution of a reference layer among the plurality of layers may be set based on a resolution input through a camera included in an electronic device, for example, the first electronic device 310, and a resolution of each of the other layers among the plurality of layers may be set based on the resolution of the reference layer. For example, a resolution of each of layers may be set so that a width according to a resolution of a layer n may be two folds of a width (e.g., n times or n multiples, etc., or in other words based on a first reference resolution dimension) according to a resolution of a layer n−1 and a height according to the resolution of the layer n may be two folds of a height (e.g., based on a first reference resolution dimension) according to the resolution of the layer n−1. In detail, if a screen size input through the camera (e.g., the image resolution of the image captured by the camera) included in the first electronic device 310 is 315×235, a resolution of layer 1 may be 315×235. Here, a resolution of layer 2 may be 630×470 and a resolution of layer 3 may be 1260×940, etc.

That is, a resolution of a layer may be variably set to be included in a resolution range of a corresponding class based on the screen size input through the camera, instead of being fixed to, for example, 496×360 for quarter video graphic array (QVGA), 640×480 for video graphic array (VGA), etc. Also, a size thereof may be set so that a width and a height may be two folds (e.g., multiples, or otherwise based on) of a corresponding width and height, respectively. Accordingly, it is possible to expect a performance enhancement from resizing.

Also, the layer n may be encoded based on the layer n−1. For example, once the layer 1 is generated, the layer 2 may include only additional information (e.g., additional necessary information) over the information in the layer 1. That is, the layer n may share data of layers from the layer 1 to the layer n−1 and may include additional data to construct a video stream encoded based on the resolution of the layer n.

Meanwhile, the video conference server 340 may readjust a layer capable of being uploaded (e.g., transmitted) by the first electronic device 310 based on the network situation, for example, a network resource or network traffic measured by the video conference server 340. For example, when the first electronic device 310 notifies the video conference server 340 that the first electronic device 310 may provide layers from the layer 1 to the layer 3, such as "layer=3", the video conference server 340 may limit a number of layers capable of being uploaded by the first electronic device 310 to layers up to the layer 2, based on the network situation. In this case, "response" of the first box 351 indicated with dotted lines may include a readjusted layer identifier, for example, "layer=2".

A process represented by a second box 352 indicated with dotted lines shows an example of a process in which the second electronic device 320 participating in the video conference notifies the video conference server 340 of a playable resolution of the second electronic device 320 and the video conference server 340 responds thereto. In the second box 352 indicated with dotted lines, "layer=2" may indicate that the second electronic device 320 may play an image and/or video at the resolution of the layer 2.

A process represented by a third box 353 indicated with dotted lines shows an example of a process in which the third electronic device 330 participating in the video conference notifies the video conference server 340 of a playable resolution of the third electronic device 330 and the video conference server 340 responds thereto. In the third box 353 indicated with dotted lines, "layer=1" may indicate that the third electronic device 330 may play an image and/or video at the resolution of the layer 1.

A playable resolution of a receiving client, for example, the second electronic device 320 and the third electronic device 330, is determined based on one or more characteristics of the receiving electronic device. Accordingly, the video conference server 340 may transfer layers without separately readjusting the layers, in response to a request from the second electronic device 320 and the third electronic device 330.

A process represented by a first arrow indicator 354 may be a process in which the first electronic device 310 uploads layers (e.g., the images and/or video encoded or rendered at the resolution(s) corresponding to the layers) to the video conference server 340. In the example embodiments, the first electronic device 310 may notify the video conference server 340 that the first electronic device 310 may upload layers from the layer 1 to the layer 3, and may upload images and/or video encoded or rendered at layer 1 level, layer 2 level, and layer 3 level to the video conference server 340.

A process represented by a second arrow indicator 355 and a third arrow indictor 356 may be a process in which the video conference server 340 transfers the requested layers (e.g., the images and/or videos encoded or rendered at the requested layer level) to the second electronic device 320 and the third electronic device 330. Here, since the second electronic device 320 requests images and/or video of layer 2 quality, the video conference server 340 may provide the layer 1 images and/or video and the layer 2 images and/or video to the second electronic device 320. Also, since the third electronic device 330 requests the layer 1 quality, the video conference server 340 may provide the layer 1 images and/or video to the third electronic device 330.

As described above, the layer 2 images and/or video includes additional information to acquire a video stream according to the resolution of the layer 2 by sharing data of the layer 1 images and/or video. Accordingly, when the layer 2 images and/or video is transferred with the layer 1 images and/or video, the second electronic device 320 may acquire the video stream according to the resolution of the layer 2. For example, an integrated payload format of layers uploaded from the first electronic device 310 to the video conference server 340 may be in a format of "[layer 1][layer 2] [layer 3]". Here, the video conference server 340 may parse the above payload structure without transcoding, may reconstruct the payload structure into "[layer 1][layer 2]", and may provide the reconstructed payload structure to the second electronic device 320. Similarly, the video conference server 340 may parse the above payload structure without transcoding, may reconstruct the payload structure into "[layer 1]", and may provide the reconstructed payload structure to the third electronic device 330. The encoding of the layers will be discussed in greater detail in connection with FIGS. 8 to 10.

Figure 4:
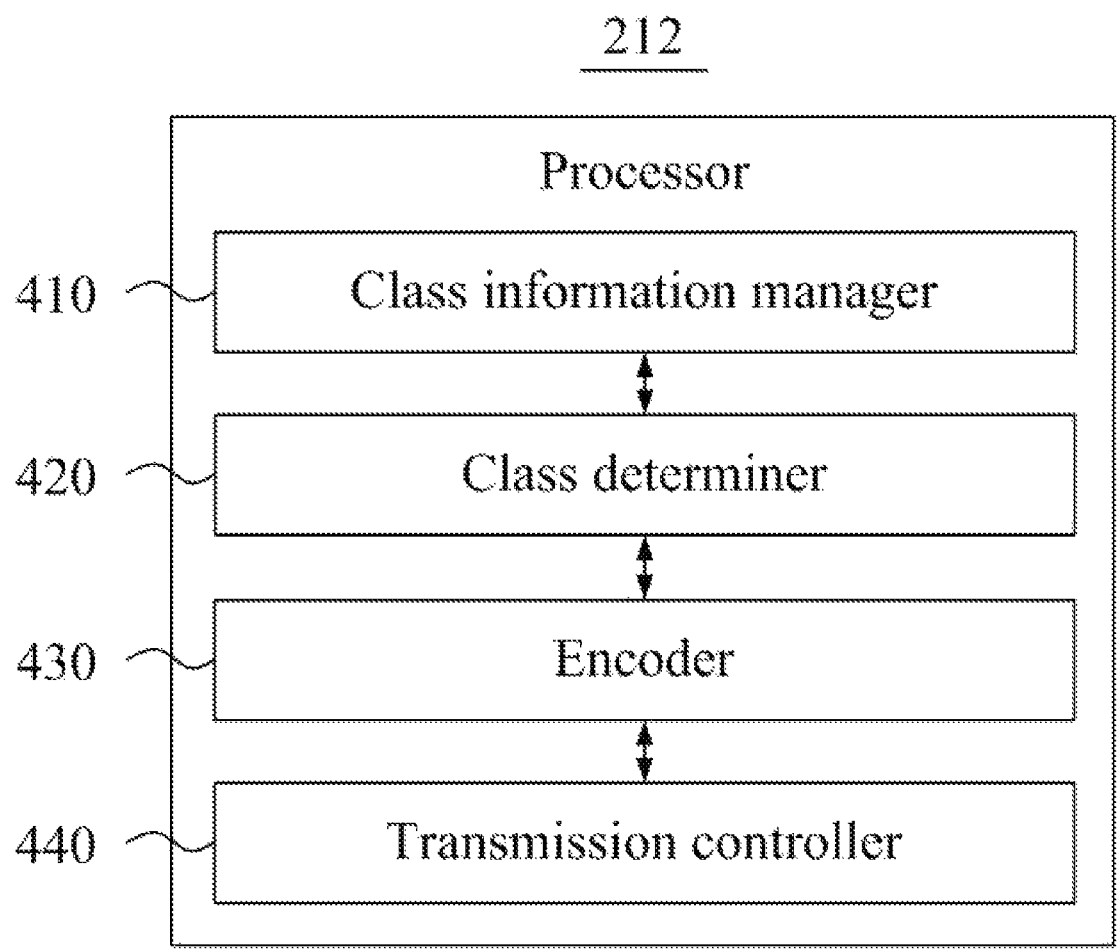
FIG. 4 is a block diagram illustrating an example of components includable in a processor of an electronic device according to at least one example embodiment.
Figure 5:
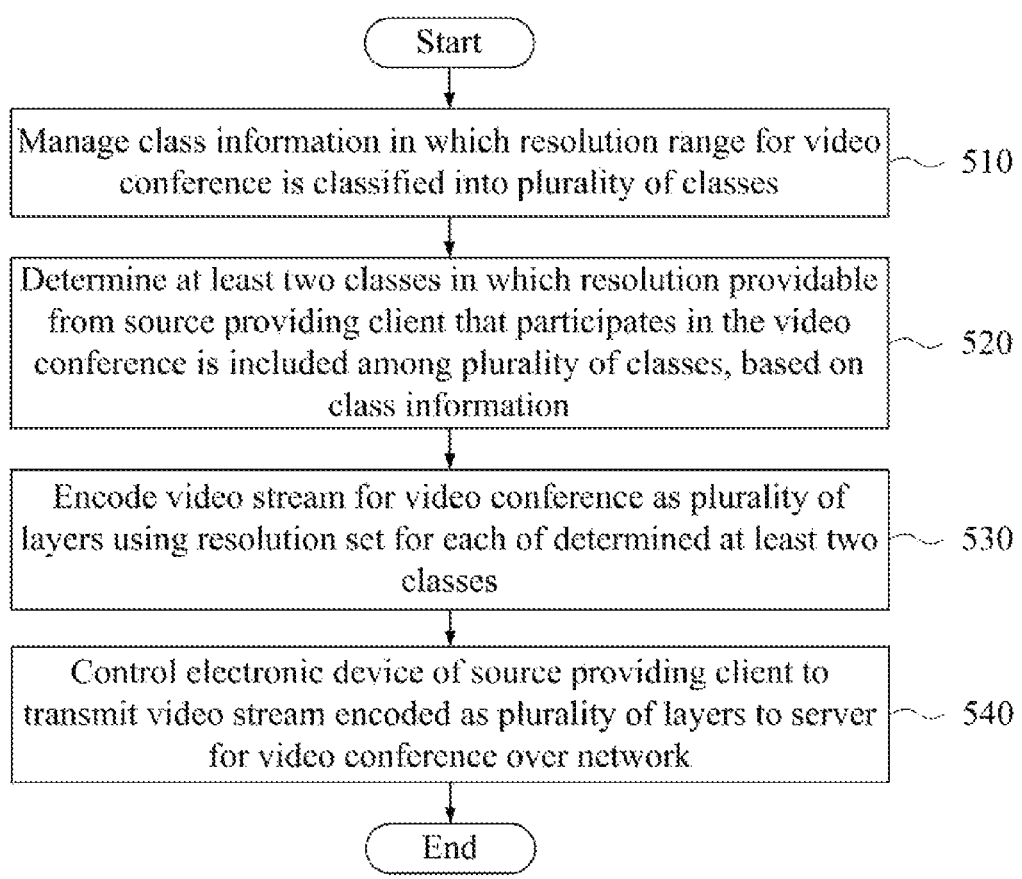
FIG. 5 is a flowchart illustrating an example of a method performed by an electronic device according to at least one example embodiment.

FIG. 4 is a block diagram illustrating an example of components includable in at least one processor of an electronic device according to at least one example embodiment, and FIG. 5 is a flowchart illustrating an example of a method performed by an electronic device according to at least one example embodiment.

The electronic device 110 according to the example embodiment may correspond to the first electronic device 310 of FIG. 3, and may serve as a source providing client. Referring to FIG. 4, the at least one processor 212 of the electronic device 110 may include a class information manager 410, a class determiner 420, an encoder 430, and a transmission controller 440, etc., but is not limited thereto.

The processor 212 and the components of the processor 212 may perform operations 510 through 540 included in the video stream providing method of FIG. 5. The processor 212 and the components of the processor 212 may be configured to execute control instructions and/or computer readable instructions according to a code of at least one program, for example, an application for providing a video conference service, and a code of the OS included in the memory 211. Here, the components of the processor 212 may be representations of different functions of the processor 212 that is performed by the processor 212 in response to a control instruction provided from the code stored on the electronic device 110. For example, the class information manager 410 may be used as a functional representation of the processor 212 that controls the electronic device 110 to manage class information.

Referring to FIG. 5, in operation 510, the class information manager 410 may manage class information in which a resolution range for a video conference is classified (e.g., divided, separated, managed, etc.) into a plurality of classes. The class information may be classification information associated with the resolution range, which is described above in connection with Table 1, Table 2, etc., and may be stored and managed in a storage device, for example, the permanent storage device of FIG. 2, of the electronic device 110, under the control of the application. Classification of the resolution range may be desired and/or preset at a server for the video conference. Here, the server may correspond to the video conference server 340, but is not limited thereto. For example, the plurality of classes may include a first class of a resolution range including a resolution of QVGA, a second class of a resolution range including a resolution of VGA, and a third class of a resolution range including a resolution of high definition (HD), etc.

In operation 520, the class determiner 420 may determine at least two classes in which a resolution providable (e.g., capable of being provided, possible resolutions, potential resolutions, available, etc.) from a source providing client that participates in the video conference is included among the plurality of classes, based on the class information. As described above, a corresponding class may be present for each class and determining a class may correspond to determining a providable layer. For example, determining the first class and the second class by referring to Table 1 may correspond to providing the layer 1 and the layer 2.

In operation 530, the encoder 430 may encode a video stream for the video conference as a plurality of layers using a resolution set for each of the determined at least two classes. As described above, a resolution of a reference layer among the plurality of layers may be set based on a screen size, for example, a resolution, input through a camera included in the electronic device 110, and a resolution of each of other layers may be set based on the resolution of the reference layer. Here, the resolution of each of the plurality of layers may be set so that a width according to a resolution of the layer n may be two folds of a width according to a resolution of the layer n−1 and a height according to the resolution of the layer n may be two folds of a height according to the resolution of the layer n−1, but the example embodiments are not limited thereto and the resolution may be any resolution within the desired resolution range of the associated layer, including resolutions that are not the same aspect ratio as the lowest resolution or the high resolution of the resolution range of the layer, in order to support display devices with different aspect ratios. The resolution range for the video conference may be classified in descending order of a resolution range so that the resolution of the layer n may be included in a resolution range of an n-th class. Also, as described above, the layer n may share data of (and/or share data with) layers from the layer 1 to the layer n−1 (e.g., lower layers), and may include additional data to construct (e.g., generate, render, etc.) a video stream encoded based on the resolution of the layer n. For example, the layer 2 may include additional data to construct a video stream encoded based on the resolution of the layer 2 by sharing the data of layer 1.

For example, if a screen size input through the camera included in the electronic device 110 is 315×235, the encoder 430 may encode the layer 1 at the resolution of 315×235. Also, if the electronic device 110 is capable of providing layers up to the layer 3, for example, if the electronic device 110 determines the first class, the second class, and the third class as classes that include providable resolutions, the encoder 430 may encode the layer 2 at the resolution of 630×470 and may encode the layer 3 at the resolution of 1260×940. Encoding as a layer of a video stream is further described.

In operation 540, the transmission controller 440 may control the electronic device 110 of the source providing client to transmit the video stream encoded as the plurality of layers to the server for the video conference over a network. Here, the network may correspond to the network 170 of FIGS. 1 and 2. Transmitting the video stream to the server may correspond to uploading layers as described with the process that is represented by the first arrow indicator 354 of FIG. 3.

Here, the server for the video conference may be configured to receive the video stream encoded as the plurality of layers, to receive, from each of at least two receiving clients that participate in the video conference, information associated with a resolution and/or resolution range playable at each of the at least two receiving clients, and to determine a layer of a video stream to be transmitted to a first receiving client among the at least two receiving clients based on the resolution information received from the first receiving client.

Each of the at least two receiving clients may be configured to transmit information about a resolution and/or ranges of resolutions playable at each of electronic devices of the at least two receiving clients, for example, the second electronic device 320 and the third electronic device 330 of FIG. 3, and to play the video stream using the layer received from the server for the video conference. For example, the second electronic device 320 of FIG. 3 may play the video stream according to the resolution of the layer 2 through the received layer 1 and layer 2.

Figure 6:
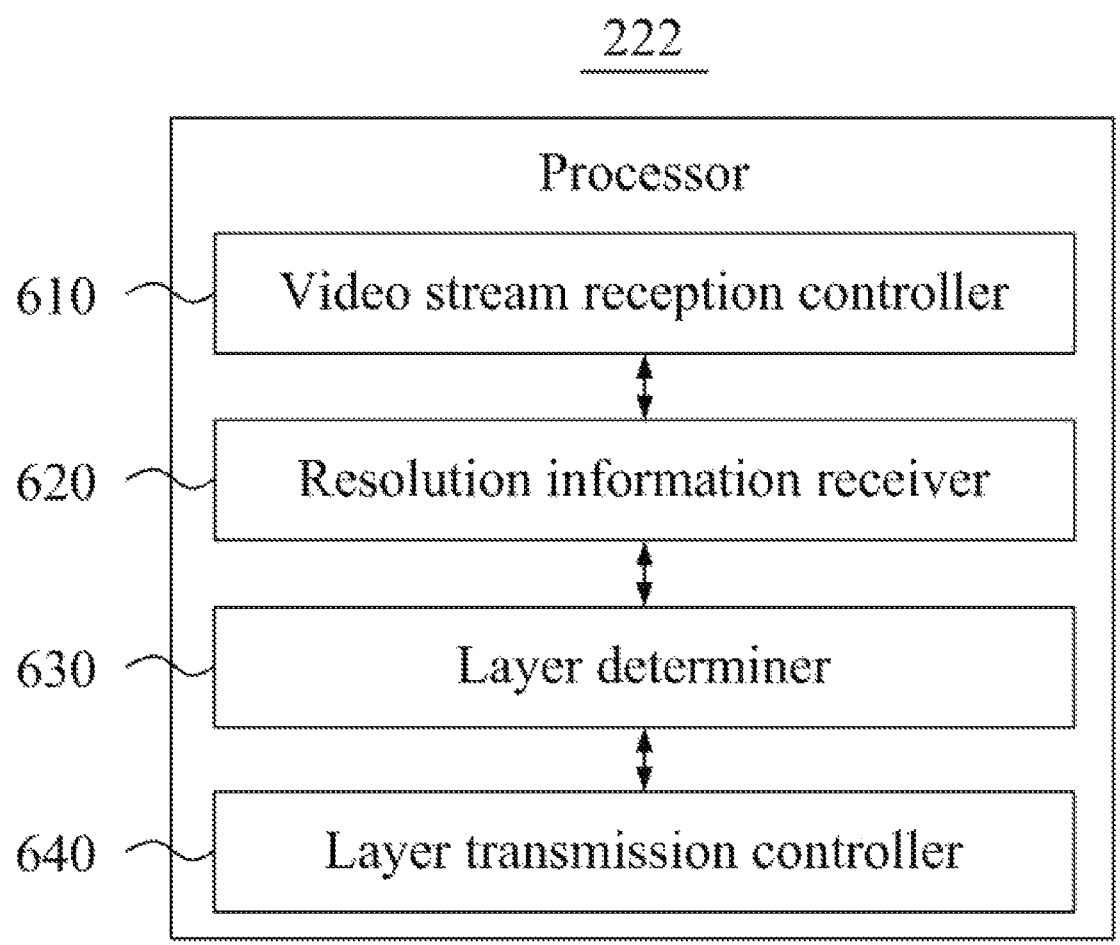
FIG. 6 is a block diagram illustrating an example of components includable in a processor of a server according to at least one example embodiment.
Figure 7:
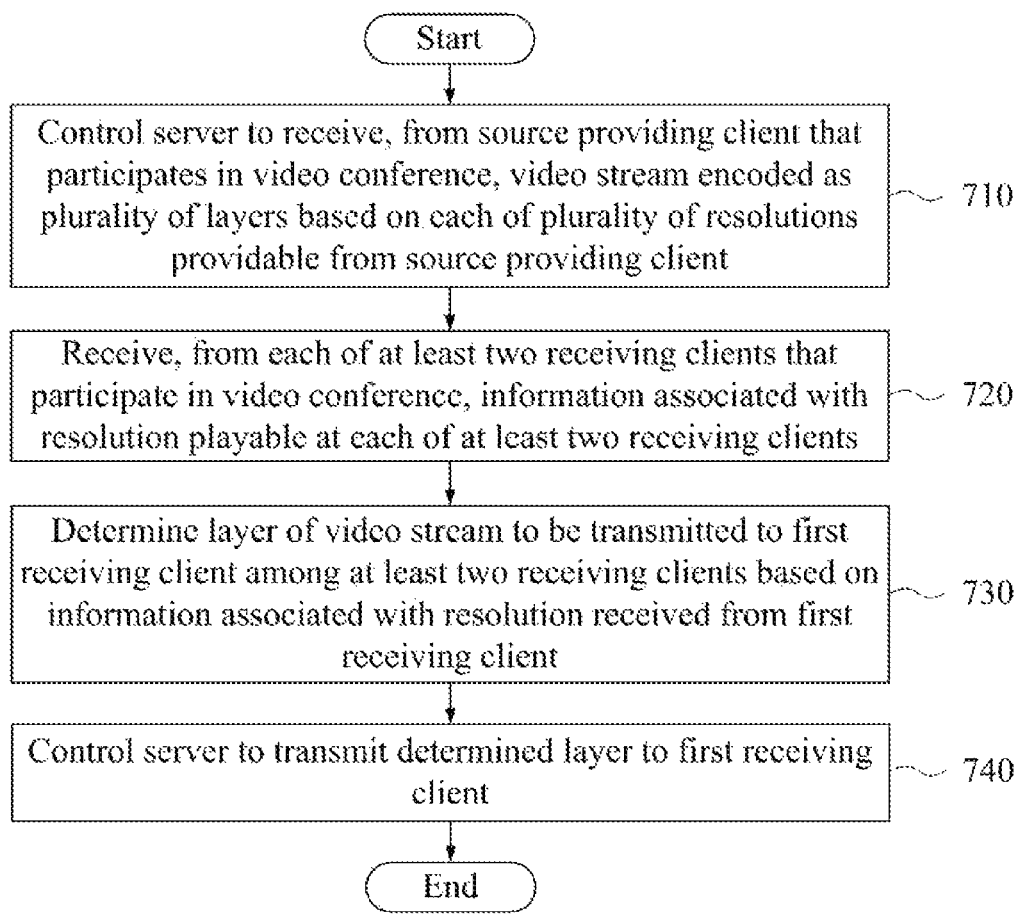
FIG. 7 is a flowchart illustrating an example of a method performed by a server according to at least one example embodiment.

FIG. 6 is a block diagram illustrating an example of components includable in at least one processor of a server according to at least one example embodiment, and FIG. 7 is a flowchart illustrating an example of a method performed by a server according to at least one example embodiment.

The server 150 according to the example embodiment may correspond to the video conference server 340 of FIG. 3. Referring to FIG. 6, the processor 222 of the server 150 may include a video stream reception controller 610, a resolution information receiver 620, a layer determiner 630, and a layer transmission controller 640, but is not limited thereto.

The processor 222 and the components of the processor 222 may perform operations 710 through 740 included in the video stream providing method of FIG. 7. Here, the processor 222 and the components of the processor 222 may be configured to execute control instructions (e.g., computer readable instructions) according to a code of at least one program or a code of the OS included in the memory 221. Here, the components of the processor 222 may be representations of different functions of the processor 222 performed by the processor 222 in response to control instructions provided by the code stored on the server 150. For example, the video stream reception controller 610 may be used as a functional expression of the processor 222 that controls the server 150 to receive the video stream.

Referring to FIG. 7, in operation 710, the video stream reception controller 610 may control the server 150 to receive, from a source providing client that participates in the video conference, a video stream encoded as a plurality of layers based on each of a plurality of resolutions providable from the source providing client. As described above, the source providing client may be configured to determine at least two classes in which a resolution providable from the source providing client that participates in the video conference is included among the plurality of classes, based on class information in which a resolution range for the video conference is classified into a plurality of classes. The source providing client may encode the video stream for the video conference as the plurality of layers using a resolution (or resolution ranges) set for each of the determined at least two classes, and to transmit the video stream encoded as the plurality of layers to the server for the video conference over a network. The description related to the layer and the class is made above and thus, a further description is omitted.

In operation 720, the resolution information receiver 620 may receive, from each of at least two receiving clients that participate in the video conference, information associated with a resolution playable, or resolution ranges, at each of the at least two receiving clients. For example, the at least two receiving clients may correspond to the second electronic device 320 and the third electronic device 330 of FIG. 3, and may transmit information about the playable resolution thereof to the server 150. Here, information about the resolution may include a layer identifier, for example, layer 1, layer 2, or layer 3.

In operation 730, the layer determiner 630 may determine a layer of a video stream to be transmitted to a first receiving client among the at least two receiving clients based on information associated with a resolution, or resolution ranges, received from the first receiving client. For example, if information about the layer (e.g., layer information indicating the highest desired layer) received from the first receiving client includes the layer identifier '2', the layer determiner 630 may determine the layer 1 and the layer 2 as layers of the video stream to be transmitted to the first receiving client. Also, the layer determiner 630 may determine at least one layer for each remaining receiving client among the at least two receiving clients based on information about a resolution, or resolution ranges, received from each receiving client.

In operation 740, the layer transmission controller 640 may control the server 150 to transmit the determined layer to the first receiving client. The layer transmission controller 640 may control the server 150 to transmit the determined layers to the remaining receiving clients among the at least two receiving clients, respectively. For example, as described above, the video conference server 340 may transmit the determined layers to the second electronic device 320 and the third electronic device 330, respectively.

Figure 8:
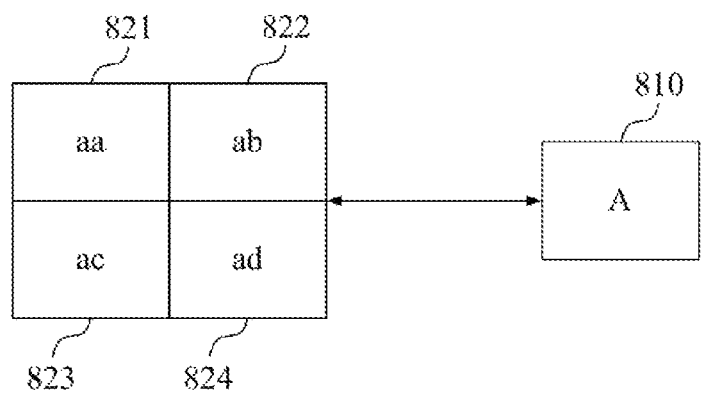
FIG. 8 illustrates an example of a relationship between a lower layer and an upper layer according to at least one example embodiment.

FIG. 8 illustrates an example of a relationship between a lower layer and an upper layer according to at least one example embodiment. An image represented using a single block 810 of a lower layer, for example, a layer 1 corresponds to an image represented using four blocks 821, 822, 823, and 824 of an upper layer (e.g., a higher layer), for example, a layer 2 since a width according to a resolution of a layer n is set to be two folds of a width according to a resolution of a layer n−1 and a height according to the resolution of the layer n is set to be two folds of a height according to the resolution of the layer n−1. Here, in the case of encoding layers, a source providing client may determine a reference frame based on a unit of the four blocks 821, 822, 823, and 824 corresponding to the single block 810 of the lower layer. For example, the lower layer, e.g., block 810, may be the reference frame and the reference frame may be divided into a plurality of blocks, such as blocks 821, 822, 823, and 824, to support a higher layer. Also, the source providing client may determine whether to use the reference frame as a last frame based on the unit of the mapped four blocks 821, 822, 823, and 824 of the upper layer, or whether to use an image regenerated from the lower layer. Such encoding is further described with reference to FIG. 9.

Figure 9:
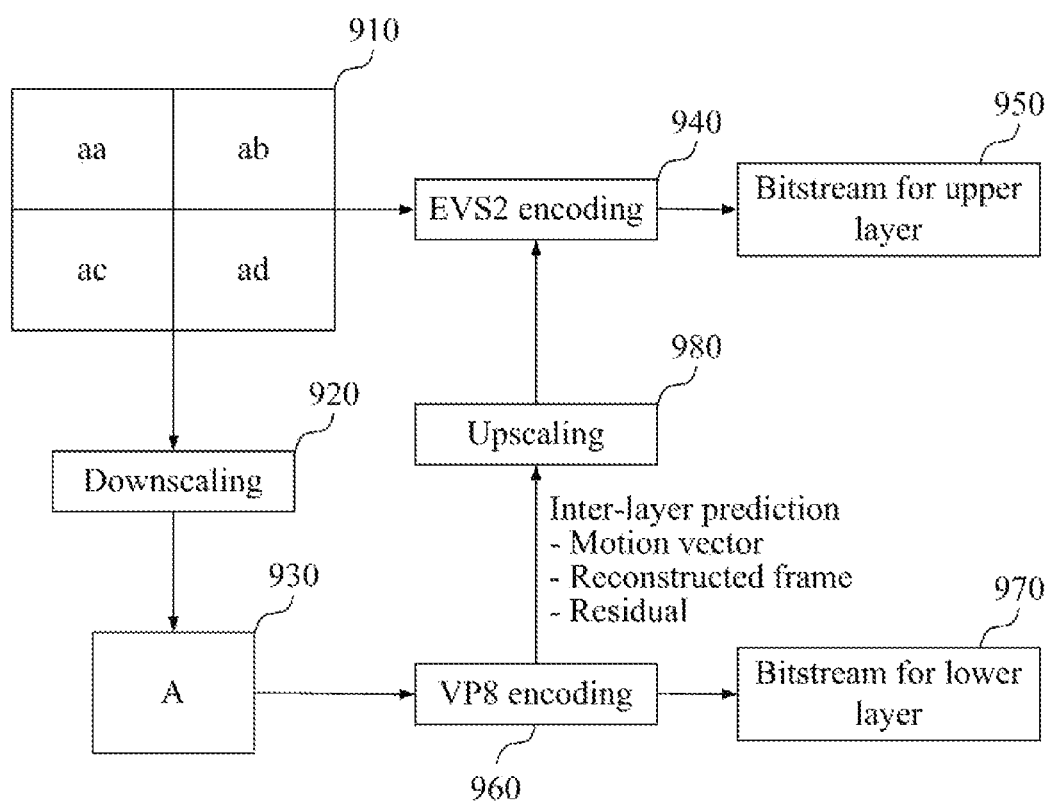
FIG. 9 illustrates an example of encoding a video stream as layers according to at least one example embodiment.

FIG. 9 illustrates an example of encoding a video stream as layers according to at least one example embodiment. Referring to FIG. 9, a source providing client may generate a frame 930 for a lower layer through downscaling (e.g., encoding a higher resolution image/video into a lower resolution image/video) 920 of an input source frame 910 for an upper layer. Here, the source providing client may generate a bitstream 950, for example, a video stream, for the upper layer through encoding 940, for example, EVS2 encoding, of the source frame 910 using an encoding format, for example, EVS2, for the upper layer, and may generate a bitstream 970 for the lower layer through encoding 960, for example, VP8 encoding, of the frame 930 for the lower layer using an encoding format, for example, VP8, for the lower layer. While FIG. 9 illustrates the use of EVS2 encoding, the example embodiments are not limited thereto and other encoding algorithms may be used as well, such as VP8, MPEG-2, MPEG-4, H.262, H.263, H.264, etc.

In this case, the source providing client may use, for encoding 940 for the upper layer, metadata, for example, a motion vector, a reconstructed frame, a residual, etc., for inter-layer prediction that are used for encoding 960 for the lower layer. Here, the reconstructed frame maybe used through upscaling 980 (e.g., encoding a lower resolution image/video into a higher resolution image/video). Here, in the case of performing encoding 940 for the upper layer, the source providing client may use a previous frame or a frame reconstructed through upscaling 980 as the reference frame. That is, upper layer encoding may be used to determine the reference frame based on a unit of four blocks corresponding to a single block of the lower layer. Also, the source providing client may retrieve an optimal motion vector based on metadata for inter-layer prediction, and may process encoding 940 for the upper layer based on the retrieved reference frame and optimal motion vector. Also, the source providing client may further encode the residual.

A main algorithm of FIG. 9 may use the motion vector calculated in the lower layer for the upper layer. A substitute algorithm of FIG. 10 may use the motion vector calculated in the upper layer for the lower layer.

Figure 10:
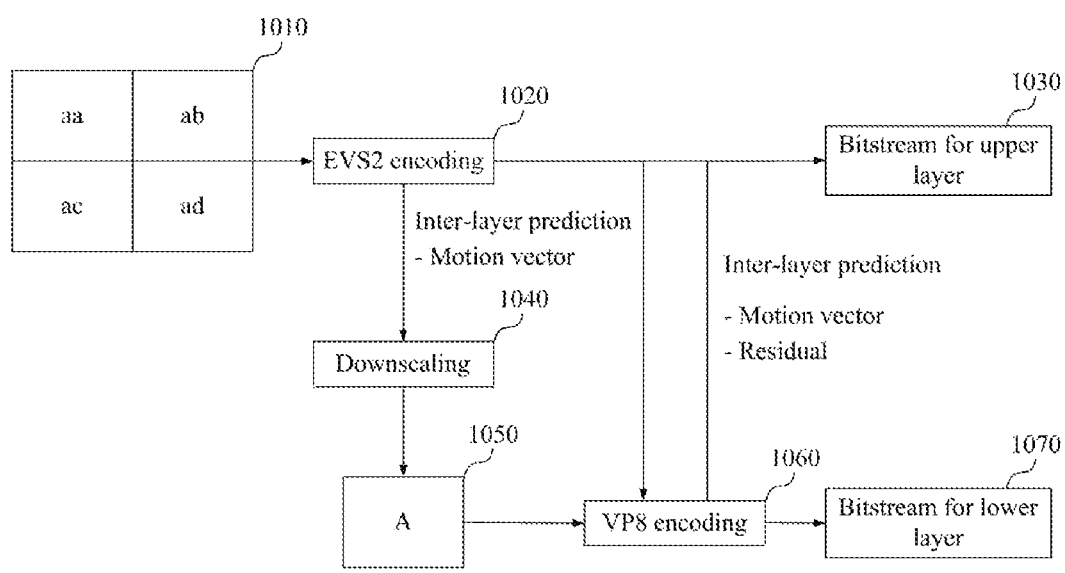
FIG. 10 illustrates another example of encoding a video stream as layers according to at least one example embodiment.

FIG. 10 illustrates another example of encoding a video stream as layers according to at least one example embodiment. Referring to FIG. 10, a source providing client may generate a bitstream 1030, for example, a video stream, for an upper layer through encoding 1020, for example, EVS2 encoding, etc., of an input source frame 1010 for the upper layer using an encoding format, for example, EVS2, etc., for the upper layer.

Here, the source providing client may generate a frame 1050 for a lower layer through downscaling 1040 of the source frame 1010, and may generate a bitstream 1070 for the lower layer through encoding 1060, for example, VP8 encoding, etc., of the frame 1050 for the lower layer using a motion vector calculated through encoding 1020 for the upper layer. Also, the source providing client may use, for the upper layer, metadata that is used for encoding 1060 for the lower layer. Similar to the example embodiment of FIG. 9, a reconstructed frame may be used through upscaling. Also, a reference frame may be determined based on a unit of four blocks of the upper layer corresponding to a single block of the lower layer.

FIGS. 8 through 10 are provided to describe an example of generating the layer n to include additional data for acquiring a video stream by sharing data of the layer 1 through the layer n−1 and are not provided to describe a method of encoding the video stream. Also, encoding formats, such as EVS2, VP8, etc., are known art and a detailed description related thereto is omitted here.

The generated layers may be appropriately routed to receiving clients through the server for the video conference.

According to some example embodiments, since a source providing client encodes a video stream as a plurality of layers for each screen size, for example, resolution and provides the encoded video stream to a server when providing a video stream for the video conference, it is possible to reduce a load on a server side. Also, according to some example embodiments, it is possible to use a screen without resizing the screen by classifying a resolution ranges into a plurality of classes, by providing a layer having a resolution included in a resolution range of each class, and by using a resolution input through a camera of a client and another resolution set based on the input resolution.

The systems and or apparatuses described herein may be implemented using hardware components or a combination of hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM, flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A server for providing a video stream of a video conference over a network, the server comprising:
   a memory having computer readable instructions stored thereon; and
   at least one processor configured to execute the computer readable instructions to,
      receive, from a source providing client connected to the video conference, an encoded video stream associated with the video conference from the source providing client, and video resolution available information including at least one layer of a plurality of layers associated with the encoded video stream of the video conference, the video resolution available information indicating a video resolution available for the source providing client to encode or decode the video stream associated with the video conference, the at least one layer of the plurality of layers corresponding to a selected video resolution being included within a video resolution range of the at least one layer,
      receive, from at least one receiving client connected to the video conference, video resolution playable information associated with a video resolution playable by the at least one receiving client,
      determine at least one layer of the encoded video stream to be transmitted to the at least one receiving client based on the received video resolution available information from the source providing client and the received video resolution playable information from the at least one receiving client, and
      transmit the determined at least one layer of the encoded video stream to the at least one receiving client without transcoding the encoded video stream by the server.

2. The server of claim 1, wherein the at least one layer of the plurality of layers includes:
   a layer corresponding to a video resolution of the encoded video stream; and
   at least one lower layer of the plurality of layers corresponding to a lower video resolution than the resolution of the encoded video stream.

3. The server of claim 1, wherein
   the encoded video stream is recorded by the source providing client based on managed class information for the video conference and hardware characteristics of the source providing client;
   the class information includes the video resolution ranges for each layer of the plurality of layers; and
   the selected video resolution of each of the plurality of layers includes,
      a width of the video resolution of a layer n is a multiple of a width of the video resolution of a layer n−1, and
      a height of the video resolution of the layer n is a multiple of a height of the video resolution of the layer n−1, wherein n denotes a natural number greater than or equal to 2.

4. The server of claim 1, wherein the determining the at least one layer of the encoded video stream to be transmitted to the at least one receiving client includes:
   parsing the encoded video stream based on the received video resolution playable information of the at least one receiving client, the parsing including identifying at least one layer of the plurality of layers of the encoded video stream that corresponds to the video resolution playable by the at least one receiving client; and
   reconstructing the video stream based on the parsed video stream, the reconstructing including removing layers from the parsed video stream that are not playable by the at least one receiving client.

5. The server of claim 1, wherein
   the plurality of layers includes at least a first layer and a second layer, the second layer having a higher video resolution range than the first layer; and
   the first layer and the second layer are generated based on a reference frame provided by the source providing client.

6. The server of claim 5, wherein
   the first layer and the second layer are generated using different encoding formats.

7. The server of claim 5, wherein
   the first layer is generated by downscaling the reference frame and encoding the downscaled reference frame.

8. The server of claim 5, wherein
   the second layer is generated based on encoding the reference frame and metadata associated with inter-layer prediction.

9. A non-transitory computer readable medium including computer readable instructions, which when executed by at least one processor of a server for providing a video stream of a video conference, causes the at least one processor to:
- receive an encoded video stream associated with the video conference from a source providing client connected to the video conference, and video resolution available information including at least one layer of a plurality of layers associated with the encoded video stream of the video conference, the video resolution available information indicating a video resolution available for the source providing client to encode or decode the video stream associated with the video conference, the at least one layer of the plurality of layers corresponding to a selected video resolution being included within a video resolution range of the at least one layer;
- receive video resolution playable information from at least one receiving client connected to the video conference, the video resolution playable information associated with a video resolution playable by the at least one receiving client;
- determine at least one layer of the encoded video stream to be transmitted to the at least one receiving client based on the received video resolution available information from the source providing client and the received video resolution playable information from the at least one receiving client; and
- transmit the determined at least one layer of the encoded video stream to the at least one receiving client without transcoding the encoded video stream.

10. The non-transitory computer readable medium of claim 9, wherein the at least one layer of the plurality of layers includes:
- a layer corresponding to a video resolution of the encoded video stream; and
- at least one lower layer of the plurality of layers corresponding to a lower video resolution than the resolution of the encoded video stream.

11. The non-transitory computer readable medium of claim 9, wherein
- the encoded video stream is recorded by the source providing client based on managed class information for the video conference and hardware characteristics of the source providing client;
- the class information includes the video resolution ranges for each layer of the plurality of layers; and
- the selected video resolution of each of the plurality of layers includes,
  - a width of the video resolution of a layer n is a multiple of a width of the video resolution of a layer n−1, and
  - a height of the video resolution of the layer n is a multiple of a height of the video resolution of the layer n−1, and wherein n denotes a natural number greater than or equal to 2.

12. The non-transitory computer readable medium of claim 9, wherein the determining the at least one layer of the encoded video stream to be transmitted to the at least one receiving client includes:
- parsing the encoded video stream based on the received video resolution playable information of the plurality of layers of the encoded video stream that corresponds to the video resolution playable by the at least one receiving client; and
- reconstructing the video stream based on the parsed video stream, the reconstructing including removing layers from the parsed video stream that are not playable by the at least one receiving client.

13. The non-transitory computer readable medium of claim 9, wherein
- the plurality of layers includes at least a first layer and a second layer, the second layer having a higher resolution range than the first layer; and
- the first layer and the second layer are generated based on a reference frame provided by the source providing client.

14. The non-transitory computer readable medium of claim 13, wherein
- the first layer and the second layer are generated using different encoding formats.

15. The non-transitory computer readable medium of claim 13, wherein
- the first layer is generated by downscaling the reference frame and encoding the downscaled reference frame.

16. The non-transitory computer readable medium of claim 13, wherein
- the second layer is generated based on encoding the reference frame and metadata associated with inter-layer prediction.

* * * * *